United States Patent [19]
Grois et al.

[11] 4,011,496
[45] Mar. 8, 1977

[54] METHOD FOR REGULATING WORK CURRENT OF HALF CIRCUITS OF BIPOLAR D.C. TRANSMISSION LINE AND SYSTEM FOR EFFECTING SAME

[76] Inventors: Khaim Shlemovich Grois, Lesnoi prospekt, 15, kv. 38; Vladislav Alexandrovich Kapustin, Grazhdansky prospekt, 85, kv. 141; Vladislav Alexeevich Merzheevsky, ulitsa Nekrasova, 60, kv. 125, all of Leningrad; Anatoly Mikhailovich Monastyrsky, ulitsa Pushkina, 14, kv. 53, Volgograd; Igor Nikolaevich Shaposhnikov, Chongarsky bulvar, 13, kv. 53, Moscow; German Vasilievich Karasev, prospekt Engelsa, 40, kv. 20, Leningrad, all of U.S.S.R.

[22] Filed: July 24, 1975

[21] Appl. No.: 598,985

[52] U.S. Cl. .............................. 321/27 R; 307/53; 307/58; 307/86; 323/1
[51] Int. Cl.² ........................................ H02P 13/16
[58] Field of Search ............. 321/27 R, 18; 307/58, 307/51, 53, 82, 85, 86; 323/1, 22 SC

[56] References Cited
UNITED STATES PATENTS

| | | | |
|---|---|---|---|
| 3,818,307 | 6/1974 | Hamilton et al. | 321/27 R |
| 3,864,620 | 2/1975 | Abbondanti | 321/27 R |

*Primary Examiner*—Gerald Goldberg

[57] ABSTRACT

A method for regulating the work current of half circuits of a bipolar d.c. transmission line comprising a plurality of interconnected electric valve bridges in the half circuits with the aid of current regulators acting upon control electrodes of the electric valves in combination with changing the number of bridges connected to the half circuits, whereby a preselected transmitted power magnitude is ensured by putting into operation an optimum number of bridges and by the optimum setting of the current regulators, the number of the operating bridges and the work current magnitude in each half circuit being determined by minimizing the sum of the transmission power loss components which depend upon the number of operating bridges, the work current magnitude, and the operating voltage in the half circuits.

2 Claims, 4 Drawing Figures

METHOD FOR REGULATING WORK CURRENT OF HALF CIRCUITS OF BIPOLAR D.C. TRANSMISSION LINE AND SYSTEM FOR EFFECTING SAME

The present invention relates to d.c. transmission and, more particularly, to methods for regulating the work current of half circuits of bipolar d.c. transmission lines and to systems for effecting said method.

There is known and widely used at present a method for regulating transmitted power of d.c. transmission lines with the aid of current regulators acting upon control electrodes of rectifier valves so that this action changes the rectified voltage magnitude between the rectifier poles and, consequently, the current magnitude in the line.

In order to regulate the transmitted power magnitude, the action of current regulators is combined with changing the voltage across the poles of disconnecting part of rectifier and inverter electric valve bridges.

In bipolar d.c. transmission lines, current regulators maintain the work current magnitudes in both half circuits, equal irrespective of the number of operating bridges. Under such operating conditions there is no current through the system ground of the central taps of converter substations.

The foregoing method has an important disadvantage which stems from the fact that increased power losses occur in d.c. transmission lines operating with different numbers of working bridges, but at equal work current magnitudes in the half circuits.

The known system for effecting the above method comprises a transmitted power setting unit, a unit for calculating the settings of the half circuit current regulator whose input is connected to an output of the transmitted power setting unit, a unit for conversion of of the half circuit current regulator settings, an input of said unit being connected to an output of the unit for calculating the settings of the half circuit current regulator, and a unit for presetting the connection sequence of the electric valve bridges.

In this system, the settings of the current regulators are effected by calculating the settings from the preset power magnitude and the operating transmission voltage. The system is installed at the sending (rectifier) substation. The transmitted power setting unit sends an instruction to the calculating unit for maintaining a preselected transmitted power level. Applied simultaneously to the calculating unit are signals relating to the voltage magnitude between the transmission line poles, the current magnitude on the line (feedback), and a blocking signal "The line out of action". The rectified current magnitude, which is calculated from the predetermined power and the magnitude of voltage between the poles, is converted into the current regulator setting.

The foregoing system is disadvantageous in that it does not ensure the optimum operating conditions for a transmission line as far as the minimizng of active power losses is concerned, which losses depend, with a preset transmission power, upon the number of operating electric valve bridges, the sequence of their connection, the operating voltage of the half circuits, and the current distribution in the half circuits.

It is an object of the present invention to provide a method for regulating work current in half circuits of a bipolar d.c. transmission line and a system for effecting this method, which would minimize losses with all preselected transmission loads.

The above and other objects of the invention are attained by putting into operation an optimum number of bridges for each preselected transmitted power magnitude and by the optimum setting of half circuit current regulators by minimizing the sum of transmission power loss components which depend upon the number of operating bridges, and the work current and operating voltage magnitudes.

The proposed method makes it possible to fully automate the regulation process by sending control signals to control and regulation units. It also provides for a semi-automatic regulation system intended to facilitate the work of the dispatcher and provide recommendations on the connection sequence of electric valve bridges and the current magnitude in the half circuits, which information may be read out, for example, from an illuminated indicator board or a typing machine.

The utilization of the present invention provides noticeable economic gains. For an operating d.c. transmission line with four bridges in each half circuit the use of the proposed method accounts for a 1 to 2 percent increase in the efficiency with a fractional transmission load.

Other objects and advantages of the present invention will become more apparent from the following detailed description thereof to be read in conjunction with the accompanying drawings, wherein.

The proposed method for regulating the work current of half circuits of a bipolar d.c. transmission line comprising a plurality of interconnected electric valve bridges in the half circuits with the aid of current regulators acting upon control electrodes of the electric valves, in combination with changing the number of operating bridges, consists in that a preselected transmitted power magnitude is ensured by putting into operation an optimum number of bridges and by the optimum setting of current regulators, the number of operating bridges and the work current magnitude in each half circuit being determined by minimizing the sum of the transmitted power loss components depending on the number of operating bridges and the work current and operating voltage magnitudes, the difference between the half circuit currents being directed to the work ground.

Figure 1:
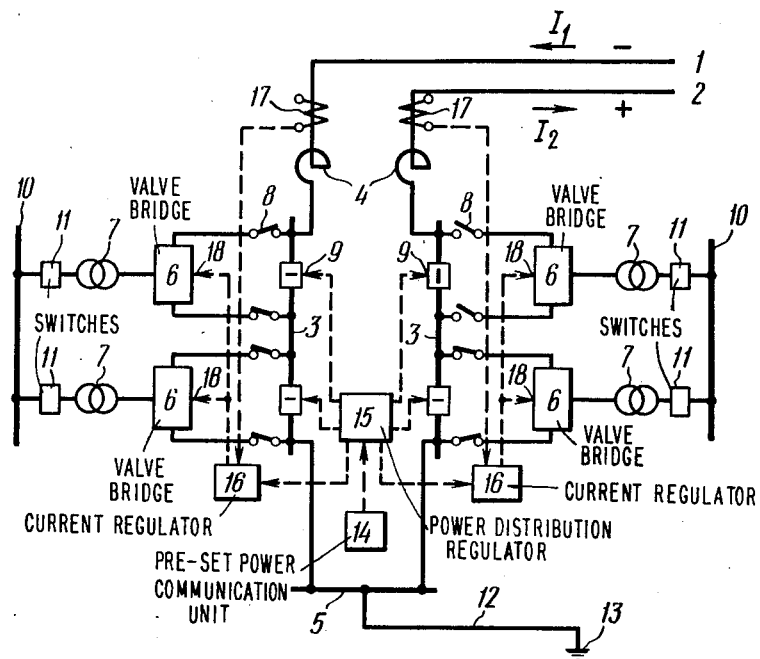
FIG. 1 is a key diagram of a rectifier substation of a bipolar d.c. transmission line with a block diagram of a current regulation system and automatic valve bridge connection system controlled in accordance with the proposed method.

FIG. 1 shows an output of a d.c. transmission line, comprising two half circuits 1 and 2 of different polarity insulated from each other. A converter substation also includes two half circuits, the forming element of each half circuit being a collecting d.c. bar 3 one end of which is connected via a line reactor 4 to one of the half circuits 1 (or 2) of the line, its other end being connected to a central tap 5 of the converter substation. The half circuit also includes electric valve bridges 6 connected to a collecting d.c. bus, and conversion transformers 7 coupled to said electric valve bridges 6.

A system of pole disconnectors 8 and shunting devices 9 makes it possible to put into operation all or part of the electric valve bridges 6. Simultaneously all the conversion transformers 7 may be connected to or disconnected from a.c. bars 10 by means of switches 11. The line may operate with a fractional number of the bridges when the load is less than the rated one, if some bridges, conversion transformers or other equipment are in repair or in reserve. FIG. 1 shows two bridges connected to the half circuit 1, and one bridge connected to the half circuit 2.

The central tap 5 of the converter substation is connected via ground line 12 to a system ground 13.

FIG. 1 is a diagram of an embodiment of a regulating system in accordance with the present invention. A long-range communication unit 14 passes information on a preset power to a system 15 for effecting the proposed method. Applied to the system 15 are signals for limiting the number of operating bridges and setting the limiting permissible working current magnitudes for each half circuit, said signals being transmitted either automatically from the unit 14, or manually by the maintenance personnel. On the basis of this information and in accordance with a program put therein, the system 15 determines the optimum number of bridges to be put into operation, the number of operating bridges in each half circuit, and the optimum current magnitudes in the half circuits. Corresponding signals are converted and directed from the system 15 to automatic bridge connecting devices (the diagram of FIG. 1 schematically shows only the connections to the shunting devices 9) and to setting units of current regulators 16 which generate, upon a comparison with signals of current transformers 17, control signals to be applied to control electrodes 18 of the electric valves of the bridges 6.

Figure 2:
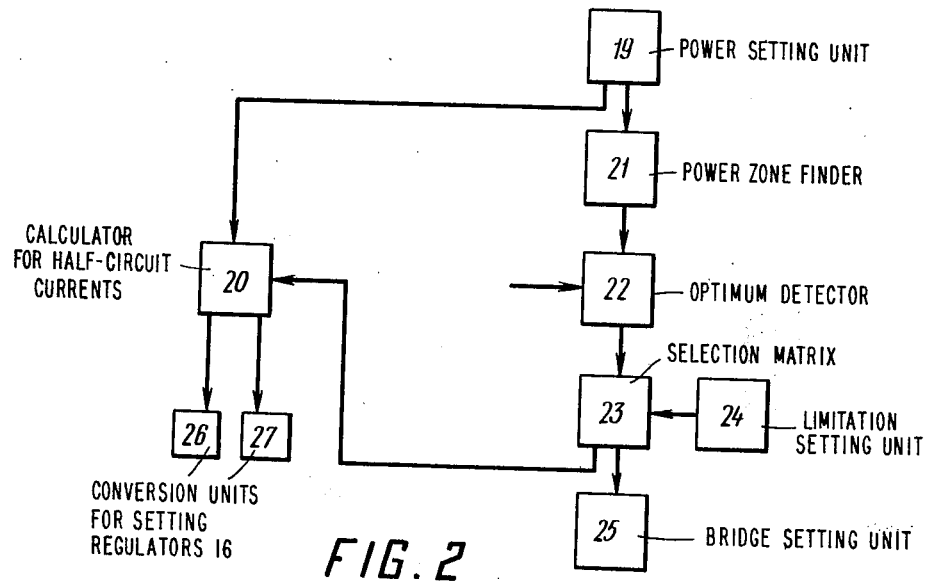
FIG. 2 is a functional block diagram of a semi-automatic system for effecting the proposed method.

An alternative embodiment of the system 15, which ensures semi-automatic regulation of the power distribution in the half circuits, is shown in FIG. 2.

This system comprises a transmitted power setting unit 19, a unit 20 for calculating half circuit current regulator settings, a transmitted power zone finder 21, an optimum detector 22, a matrix 23 for selecting operating connection sequence of the bridges, a limitation setting unit 24, a unit 25 for setting the operating connection sequence of the electric valve bridges, and units 26 and 27 for converting the settings of the half circuit current regulator 16.

A first input of the unit 20 is connected to a first output of the transmitted power setting unit 19, a second output of the setting unit 19 is connected to an input of the power zone finder 21 whose output is connected to an input of the optimum detector 22 whose output is connected to a first input of the selection matrix 23 whose second input is connected to an output of the limitation setting unit 24, a first output of the selection matrix 23 being connected to an output of the unit 25 for setting the operating connection sequence of the electric valve bridges, whereas inputs of the units 26 and 27 for converting half circuit current regulator settings, a second output of the selection matrix 23 being connected to a second input of the unit 20 for calculating half circuit current regulator settings.

As is shown in the functional block diagram of FIG. 2, from the power setting unit 19, signals are applied to the unit 20 for calculating half circuit currents and to the transmitted power zone finder 21. The latter is intended to find a zone with a definite and constant connection sequence of the bridges with reference to minimizing the sum of transmission power loss components, and to generate a coded signal which is converted by the optimum detector 22, in accordance with a predetermined program, into a priority sequence of connecting the bridges, beginning with an optinum one with respect to minimizing losses for the given power zone.

As is further shown in FIG. 2, the priority sequence of the transmission line condition codes is transmitted from the optimum detector 22 to the selection matrix 23.

The limitation setting unit 24 serves to generate signals for limiting the number of bridges to be put into operation and to set limiting current values for each half circuit.

Limitations such as "Bridge No . . . in repair", "Half Circuit No . . . in repair", "current in Half Circuit No . . . not greater than . . . ", "current in Half Circuit No . . . not less than . . . ", etc. may be put into the limitation setting unit 24 either manually or automatically.

The selection matrix 23 may be constructed as a diode coincidence matrix, a ferrite core matrix, or a set of electromechanical relays. The matrix 23 is intended to compare the circuit condition code selected by the optimum detector 22 with the code for limiting the number of bridges to be put into operation, which latter code is produced by the limitation setting unit 24.

The results of comparing the limitation code signals and the circuit condition signals are applied to the unit 20 for calculating half circuit current regulator settings and to the unit 25 for setting the operating connection sequence of the bridges. If the codes coincide, the optimum detector 22 leaves the respective sequence out of calculation and produces a new circuit condition code. The operation may be repeated several times.

In case there is no coincidence of the signals from the selection matrix 23 and the limitation setting unit 24, the selection matrix 23 sends signals to the calculating unit 20, which signals control the load distribution between the half circuits.

The rectified current magnitudes in the half circuits, which are determined in the calculating unit 20 on the basis of these data and in accordance with the program, are compared to half circuit current limitation signals arriving from the unit 24. If the estimated current values are beyond the predetermined limits, the respective connection sequence is left out of calculation, and a new circuit condition code is produced by acting upon the optimum detector 22. If the estimated current magnitudes are within the predetermined limits, permission is given for the application of signals from the matrix 23 to the unit 25 for setting the operating connection sequence of the electric valve bridges, and from the calculating unit 20 via the conversion units 26 and 27 to the setting units of the current regulators 16, which results in the formation of a new operational sequence of the converter substation and ensures optimum transmission conditions.

Figure 3:
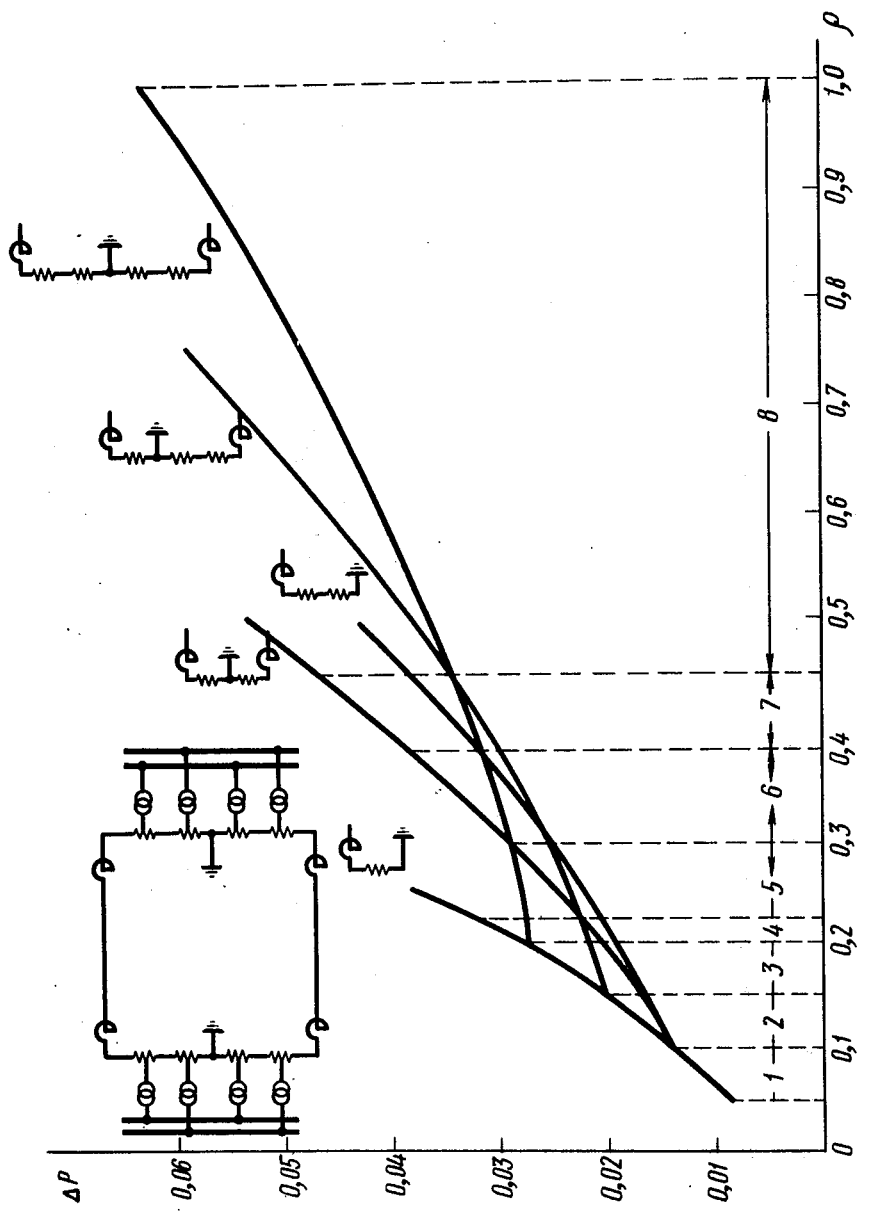
FIG. 3 is an exemplary active loss plot in a d.c. transmission line as a function of the transmitted power versus the number of operating bridges in the half circuits.

By way of illustration the operational sequence of the system as shown in FIG. 3 will next be considered.

FIG. 3 shows a plot of total losses $\Delta P$ in a d.c. transmission line versus transmitted power P (losses $\Delta P$ and power P connected with the rated power Pr). The plot is made for an imaginary bipolar d.c. transmission line with two seriesly connected converter units (bridges)

in each half circuit. The plotted curves correspond to all possible ways of connecting the operating bridges at the substations. For each such connection the curves are calculated with reference to an optimum ratio between the half circuit loads in terms of total losses in the transmission line. This takes care of the losses depending upon the current magnitude in the line and substation equipment, the voltage across the line, the amount of operating substation equipment, and power consumption to cover local needs, which are independent of the load.

The plot is divided into a number of (specifically, eight) zones so that within each transmitted power zone there is a definite and constant priority sequence of connection with reference to the load distribution between the half circuits which is optimum for each set of operating equipment and in terms of the overall transmitted power.

With a more complicated substation circuitry (a greater number of seriesly connected bridges, and the presence of bridges connected in parallel), the number of possible connection combinations and, consequently, the number of power zones, is increased.

Suppose operation has to be carried out with a power equal to 50 percent of the rated power. The power zone finder points to the 8th zone. The optimum detector 22 indicates the priority connection sequence (with reference to the number of bridges in the half circuit) which is 2+2, 2+1, 2+0, 1+1.

If no limitations are registered in the matrix 23, provisions are made for sending a signal to the unit 25 for setting the operating connection sequence of the electric valve bridges in accordance with the optimum combination 2+2. Simultaneously, the connection data are sent to the calculating unit 20 which determines, according to a present program, the optimum operating conditions, whereby the currents in the half circuits are maintained equal. The operating condition data is transmitted to the conversion units 26 and 27 and to the operating connection setting unit 25.

In case there is a limitation: "the bridge to be repaired" — the limitation code prevents, via the matrix 23, the arrival of the signal at the unit 25. The optimum detector 22 is then acted upon and points to the combination 2+1. Meanwhile, the calculating unit 20 indicates the optimum ratio between the current magnitude in the half circuit with two bridges and the current magnitude in the half circuit with one bridge, which is 1.5:1.0. Other types of limitations will suggest the combination 2+0 or the less advantageous combination 1+1 (the latter applies to the case when the half circuit currents are equal).

As has been indicated in the description of the diagram of FIG. 2, the semi-automatic version of the system is serviced by an operator (dispatcher).

In this case the unit 25 is an indicator (an illuminated board or a digital printer) for indicating (recommending) bridge connection combinations, whereas the units 26 and 27 are indicating instruments for reading out the current regulator settings. The operator (or dispatcher) controls the optimum detector 22, making it search in the required direction if the recommendation is out of keeping with the limitations.

The operator (dispatcher) introduces limitations as to putting bridges into operation into the limitation setting unit 24 and then reads out the recommended bridge combination from the indicator board 25, and estimated half circuit current values from the indicating instruments 26 and 27. In case there is no recommendation on the indicator board (as far as the limitations are concerned) or if the estimated values are beyond the preset limits, the operator manipulates the optimum detector 22. On the basis of the recommendation thus obtained, the operator (dispatcher) sets the current regulators 16 of both half circuits and actuates the shunting devices 9 (FIG. 1) with the aid of corresponding automatic bridge connecting means.

Figure 4:
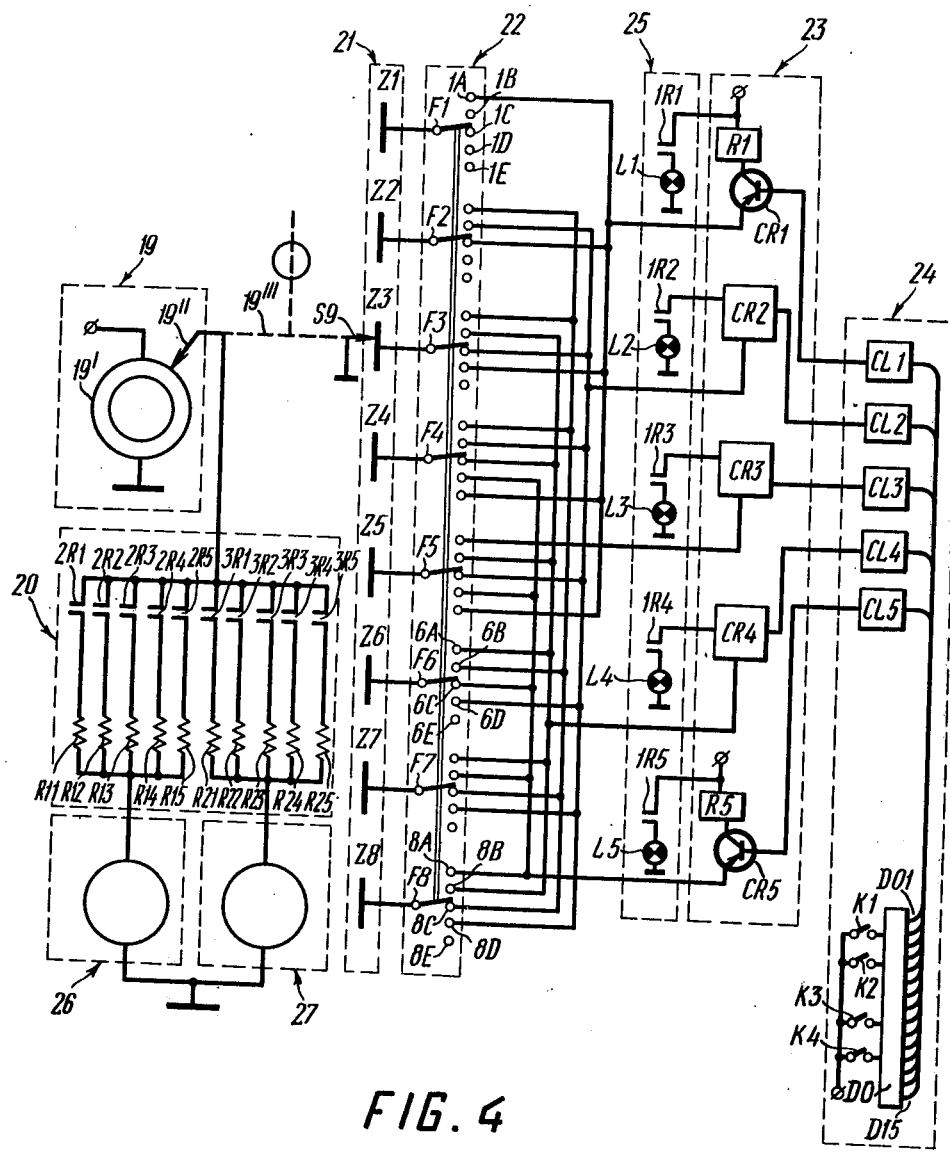
FIG. 4 is an exemplary key diagram of a semi-automatic system for effecting the proposed method.

FIG. 4 shows, by way of example, a key diagram of a semi-automatic system for effecting the proposed method as applied to a bipolar transmission line comprising two bridge units in a half circuit. Operation of this line is illustrated by the plot of FIG. 3.

The power setting unit 19 is a potentiometer 19'. The displacement of a brush 19'' of said potentiometer 19' is proportional to a preset power and is effected with the aid of a kinematic connection and, more specifically, long-range communication means 19''' (from the unit 14 of FIG. 1). Simultaneously, the power zone finder 21 is acted upon through the kinematic connection means 19''''. The finder 21 is a disk divided into eight conducting sectors (zones) Z1 to Z8 whose boundaries correspond to those of the eight power zones of FIG. 3 (a rotation angle of the disk being proportional to the rated power of the transmission line).

Sliding across the sectors in a brush S9 connected to the zero potential. Each zone Z1 to Z8 is electrically coupled to a corresponding field F1 to F8 of the optimum detector 22. Each field comprises five bars similar to bars 1A to 1E of the field F1. The switching of the detector shifts a contact brush of the given field.

The bars 1A to 8E are electrically connected to transistor emitters of relay cells CR1 to CR5 of the selection matrix 23. Relays R1 to R5 are actuated as zero potential is applied to the emitter of the respective transistor (of the above-mentioned cells CR1 to CR5) from respective bars of the optimum detector 22, which is accompanied by applying to the base of the same transistor of a negative potential from the limitation setting unit 24 which is a decoder of the position of switches K1 to K4. Contacts 1R1 to 1R5 of the relays R1 to R5, which contacts are arranged in the unit 25 for setting the operating connection sequence of the bridges, switch on signal lamps L1 to L5. Each lamp corresponds to a certain combination:

L1 corresponds to one unit in one half circuit;
L2 corresponds to one unit in each half circuit;
L3 corresponds to two units in one half circuit;
L4 corresponds to two units in one half circuit and one unit in the other;
L5 corresponds to two units in both half circuits.

Apart from the four switches K1 to K4 which serve to set limitations as to putting into operation each substation unit, the unit 24 comprises a binary decoder D-0 and logical cells. Outputs D01 to D15 of the decoder D-0 are connected to NOT logical cells CL1 to CL5, outputs of the NOT circuits being connected to the respective bases of the transistors CR1 to CR5.

The switching of the bars of the optimum detector 22 is effected by the operator (dispatcher).

The function of calculating current distribution between the half circuits is performed by the unit 20 which includes contacts 2R1 to 3R5 of the relay R1 to R5 and transistors R11 to R25 connected thereto. Each contact connects the brush 19'' of the potentiometer 19' to the indicating instruments 26 and 27 via the resistors 2R1 to 3R5 having preselected values.

By way of example, consider now the operation of the circuit with a preset power which is one half of the rated power (in zone 8 of FIG. 3).

It is clear from FIG. 3 that the optimum power distribution between the transmission line's half circuits is effected by putting into operation all the substation's bridges (two bridge units per each half circuit).

Suppose that the switch K1 of the decoder D-0 prohibits the connection of one bridge of the first half circuit. Zero potential is applied then from the output of the decoder D-0 to the NOT logical cell with CL5. The transistor of the cell CR5 in this case is not conducting.

The remaining transistors are ready for operation (with negative potentials being applied to their bases). The relays R1, R2, R3 and R4 of these transistors are connected to the indicator lamps L1 to L4.

In the present example, the brush 19'' of the potentiometer 19' is in the zone Z8 of the finder 21; the field F8 of the optimum detector 22 is connected to the zone Z8 applied whereto is zero potential.

If the contact brush of the field R8 is on the bar 8A, zero potential is applied to the emitter of the transistor CR5 which is not prepared for operation; the brush of the field F8 is moved onto the bar 8B by the operator, which results in applying zero potential to the emitter of the transistor CR4.

The latter transistor is ready for operation (considering the state of its base), so it becomes conducting. The winding of the relay R4 is energized, and with its contact 1R4 the relay R4 switches on the indicator lamp L4 of the connection pattern "two bridge units in one half circuit and one bridge unit in the other". Simultaneously, the contacts 2R4 and 3R4 of the relay R4 connect the resistors R14 and R24 to the potentiometer 19'. The resistance value of said resistors is such that the half circuit currents are read out from the indicators 26 and 27, which currents are optimum for transmitting the preselected power with the use of the preselected substation circuitry. The ratio between the currents is 1.5; the current through the half circuit with two bridges is greater by 50 percent than that through the half circuit with one bridge.

What is claimed is:

1. A method for regulating the work current of half circuits of a bipolar d.c. transmission line having a plurality of interconnected electric valve bridges in said half circuits, such that a preselected transmitted power magnitude is effected by acting, via current regulators, upon control electrodes of the electric valves, said method comprising putting an optimum number of electric valve bridges into operation by the current regulators at an optimum current regulator setting and establishing the number of said operating bridges as well as the work current magnitude in each half circuit by minimizing the sum of the transmitted power loss components which depend upon the number of said operating bridges, the work current magnitude, and the operating voltage magnitude in said half circuits.

2. A semi-automatic system for regulating the work current in half circuits of a bipolar d.c. transmission line having a plurality of interconnected electric valve bridges with control electrodes, said system comprising a transmitted power setting unit having first and second outputs, means for calculating half circuit current regulator settings having a first input connected to a first output of said transmitted power setting unit, means for converting half circuit current regulator settings having an input connected to an output of said means for calculating half circuit current regulator settings, means for setting an operating connection pattern of the electric valve bridges, a power zone finder for finding a zone wherein there is a definite and constant connection sequence of said electric valve bridges for minimizing the sum of transmitted power loss components, an optimum detector for determining the connection pattern codes of said electric valve bridges, beginning with the optimum connection pattern in the given power zone, a selecting matrix for selecting an operating connection pattern of said electric valve bridges, and a limitation setting unit for generating signals for limiting the number of said electric valve bridges put into operation and the current magnitude in each said half circuit, the second output of said power setting unit being connected to an input of said power zone finder whose output is connected to an input of said optimum detector whose output is connected to a first input of said selecting matrix, a first output of which is connected to an input of said means for setting the operating connection pattern of said electric valve bridges, a second input of said selecting matrix being connected to an output of said limitation setting means, whereas a second output of said selecting matrix is connected to a second input of said means for calculating half circuit current regulator settings.

* * * * *